United States Patent Office 3,562,336
Patented Feb. 9, 1971

3,562,336
SYNTHESIS OF NAPHTHALENE DERIVATIVES
Peter H. Nelson, Los Altos, Calif., assignor to Syntex Corporation, Panama, Panama, a corporation of Panama
No Drawing. Filed July 24, 1968, Ser. No. 747,071
Int. Cl. C07c 43/20
U.S. Cl. 260—613        4 Claims

ABSTRACT OF THE DISCLOSURE 2-(6-methoxy-2'-naphthyl)propanal is synthesized from 6-methoxy-2-acetylnaphthalene by treatment with a phosphonium ylid, sulfonium ylid or a phosphonate carbanion followed by acid hydrolysis to the aldehyde which is converted into 2-(6'-methoxy-2'-naphthyl)propanol by reduction and into 2-(6'-methoxy-2'-naphthyl)propionic acid by oxidation, these compounds have anti-inflammatory activity.

---

This invention relates to the novel synthesis of naphthalene derivatives. More particularly, the present invention relates to the synthesis of 2-(6'-methoxy-2'-naphthyl)propanal, 2 - (6'-methoxy-2'-naphthyl)propan-1-ol and 2-(6'-methoxy-2'-naphthyl)propionic acid and novel intermediates.

The process of the present invention can be outlined as follows wherein R represents lower alkyl, phenyl or substituted phenyl.

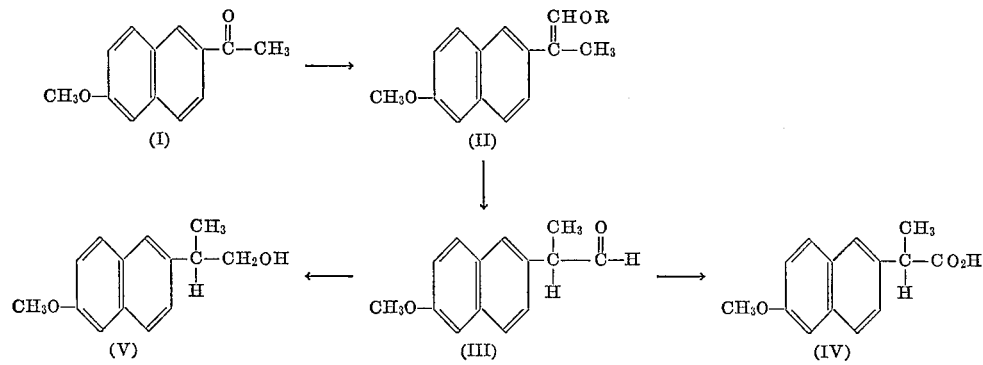

In the practice of the above process, 6-methoxy-2-acetylnaphthalene (I) is reacted with a phosphonium ylid of the following formula in which R is as defined above:

$$(\phi)_3P{=}CHOR$$
(A)

to yield the 6-methoxy-2[2'-(1'-alkoxy, phenoxy or substituted phenoxypropenyl)]naphthalene (II). This reaction is carried out using about equimolar amounts of the phosphonium ylid and 6-methoxy-2-acetylnaphthalene. Suitable organic solvents for the reaction medium include hydrocarbons, such as benzene, toluene, hexane, and the like; ethers, such as diethyl ether, tetrahydrofuran, dioxane, monoglyme, diglyme, and the like; and mixtures thereof. Any organic solvent can be used for the reaction medium so long as it is inert to the reaction. When the phosphonium ylid (A) is prepared in situ, the ketone (I) can be introduced as a solution using the same solvent or a solvent different but miscible with that used for the preparation of the ylid. The reaction generally goes to completion in from about 0.5 hour to about 48 hours depending upon such factors as the temperature and reactivity of the ylid and aldehyde. The reaction temperature can vary from about —80° C. to the reflux temperature of the reaction mixture. The reaction temperature is not critical and generally it is preferable to operate at from about 0° C. to room temperature. For optimum results, it is important that the reaction be conducted under as near anhydrous conditions as possible and under inert oxygen-free atmosphere such as nitrogen, argon, and the like.

The intermediate (II), upon treatment with an inorganic or organic acid, yields the aldehyde (III). This reaction is preferably carried out using a strong mineral acid, such as sulfuric acid, in an aqueous organic solvent, such as dioxane, diglyme, tetrahydrofuran, and the like, at an elevated temperature, such as reflux temperature of the reaction mixture. Other acids which can be used are perchloric acid, methanesulphonic acid, p-toluenesulfonic acid, hydrochloric acid. The temperature is not critical but it is preferred to operate at room temperature or above to complete the reaction within a reasonable time. The concentration of acid is not critical but generally there is used 0.3% to 2% v./v.

Phosphonium ylids of Formula A which can also be illustrated as follows:

$$(\phi)_3P^+{-}\overline{C}HOR$$
(A')

in which R is as defined above, can be prepared by the reaction of a triphenylphosphonium halide, e.g. the bromide or chloride, with a reagent capable of removing hydrogen halide, such as alkyl and aryl lithium, alkali metal amides, and the like. Triphenylphosphonium halides can be prepared by known methods, such as by reacting triphenylphosphine with the appropriate organic halide. Suitable procedures for preparing the phosphonium ylid are described by A. W. Johnson, "Ylid Chemistry," Academic Press Inc., New York (1966) and in U.S. Patents 3,078,256 and 3,130,219.

The aldehyde (III), upon treatment with an oxidizing agent, such as chromium trioxide in an organic solvent inert to the reaction or chromic acid, yields the acid (IV).

Alternatively, the aldehyde (III) is subjected to reduction as by treatment with sodium borohydride, lithium aluminum hydride or diborane to yield the alcohol (V).

Compounds of Formula II above can also be prepared by reacting 6-methoxy-2-acetylnaphthalene with a sulfonium ylid of the type:

$$R'_2S^+{-}\overline{C}HOR$$

or a carbanion of the formula:

$$(R''O)_2\overset{O}{\overset{\|}{P}}{-}\overline{C}HOR$$

in which R' and R" represents lower alkyl or phenyl and

R is as defined above. Sulfonium ylids are prepared by the reaction of a dialkyl sulfide with a halomethyl ether ($x$-CH$_2$—OR; $x$ is chloro or bromo and R is as defined above) to give [R'$_2$S+CH$_2$OR]$x^-$ which is converted into the ylid by reaction with a strong base such as phenyl lithium, butyl lithium, and the like. The carbanion is produced by the action of sodium or potassium on the corresponding phosphonate which is obtained by reaction of trialkoxyphosphine with a halomethyl ether

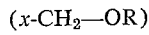

($x$-CH$_2$—OR)

See A. W. Johnson, "Ylid Chemistry," Academic Press Inc., New York, page 203 et seq. (1966).

The compounds of Formulas II, IV and V are therapeutically useful anti-inflammatory agents, analgesic agents and anti-pyretic agents. Thus, they are useful for the treatment of inflammatory conditions of the skin, bones and muscles and pain associated therewith, such as contact dermatitis, bursitus, arthritis, pruritus, and the like. They can be administered and used in the same way as phenylbutazone. For example, they can be administered orally to animals such as cats, dogs, horses, and the like, for the treatment of painful arthritic and skeletal muscular disorders.

The term "lower alkyl," as used herein, refers to saturated aliphatic hydrocarbons, branched or straight chain, of one to 8 carbon atoms such as methyl, ethyl, propyl, isopropyl, and the like. The term "substituted phenyl," as used herein, refers to a substituted phenyl such as lower alkylphenyl, halophenyl, nitrophenyl, lower alkoxyphenyl, and the like.

The following examples are provided to illustrate the present invention.

EXAMPLE 1

(A) A mixture of 5 g. of triphenylphosphine, 1.5 molar equivalents of methoxymethyl chloride and 200 ml. of ether is refluxed for about two hours. The reaction mixture is cooled and the precipitated methoxymethyltriphenylphosphonium chloride collected by filtration.

(B) Two grams of the methoxymethyltriphenylphosphonium chloride of Part A is stirred under nitrogen and an ethereal solution of 1.1 molar equivalents of phenyl lithium is added at about 0° C. One molar equivalent of 6-methoxy-2-acetylnaphthalene in benzene is added quickly while maintaining the temperature at about 0° C. The reaction mixture is allowed to come to room temperature and methanol is added until a substantially clear solution is obtained. The solution is then washed with water, dried over magnesium sulfate and evaporated to dryness. The residue is dissolved in hot ethyl acetate, an equal volume of hot hexane added, cooled, filtered to remove tirphenylphosphine oxide, and the filtrate evaporated. This residue is dissolved in hot ethyl acetate, an equal volume of hot hexane added, cooled, filtered and the filtrate evaporated to yield 2-[2'-(1'-methoxypropenyl)]-6-methoxynaphthalene (II; R is methyl).

(C) Three grams of 2-[2'-(1'-methoxypropenyl)]-6-methoxynaphthalene is dissolved in 60 ml. of dioxane and 20 ml. of water containing 0.5 ml. of concentrated sulfuric acid. The solution is refluxed under nitrogen for three hours, cooled, poured into 100 ml. water and extracted with ether. The ether extract is washed with dilute aqueous sodium bicarbonate, dried over magnesium sulfate and evaporated to yield 2-(6'-methoxy-2'-naphthyl) propanal (III) which is recrystallized from ethyl acetate: hexane.

EXAMPLE 2

A solution of 2 g. of 2-(6'-methoxy-2'-naphthyl)-propanal in 20 ml. of anhydrous tetrahydrofuran is cooled to —75° C. in a Dry Ice-acetone bath and treated with a previously cooled solution of 0.6 g. of lithium aluminum hydride in 20 ml. of anhydrous tetrahydrofuran. After maintaining the reaction mixture at —75° C. for one hour and at room temperature for 30 minutes, it is poured into ice water and extracted several times with ethyl acetate. These extracts are washed with dilute hydrochloric acid and then with water to neutrality, dried over anhydrous sodium sulfate and evaporated to dryness under vacuum. The residue is crystallized from acetone:hexane to yield 2-(6'-methoxy-2'-naphthyl)propanol.

EXAMPLE 3

To a stirred solution of 1 g. of 2-(6'-methoxy-2'-naphthyl)propanal in 10 ml. of acetone, cooled to 0° C., is added under nitrogen the theoretical amount of a solution of 8 N chromic acid (prepared by mixing 26 g. of chromium trioxide with 23 ml. of concentrated sulfuric acid and diluting with water to 100 ml.). The mixture is then stirred for five minutes at 0–5° C. and diluted with water. The solid which forms is collected by filtration, washed with water and dried under vacuum to yield 2-(6'-methoxy-2'-naphthyl)-propionic acid which may be further purified by recrystallization from aqueous methanol.

EXAMPLE 4

(A) The procedure of Example 1A is repeated using an equivalent amount of (1) phenoxymethyl chloride, (2) p-methoxyphenoxymethyl chloride, (3) p-nitrophenoxymethyl chloride, (4) ethoxymethyl chloride and (5) n-propoxymethyl chloride in place of methoxymethyl chloride to yield: (1) phenoxymethyltriphenylphosphonium chloride, (2) p-methoxyphenoxymethyltriphenylphosphonium chloride, (3) p-nitrophenoxymethyltriphenylphosphonium chloride, (4) ethoxymethyltriphenylphosphonium chloride and (5) n-propoxymethyltriphenylphosphonium chloride, respectively.

(B) The foregoing triphenylphosphonium chlorides are reacted with phenyl lithium to yield the corresponding phosphonum ylid which is reacted with 6-methoxy-2-acetylnaphthalene according to the procedure of Example 1B to yield: (1) 2-[2'-(1'-phenoxypropenyl)] - 6 - methoxynaphthalene (II; R is phenyl), (2) 2-[2'-(1'-p-methoxyphenoxypropenyl)] - 6 - methoxynaphthalene (II; R is p-methoxyphenyl), (3) 2 - [2' - (1' - p - nitrophenoxypropenyl)]-6-methoxynaphthalene (II; R is p-nitrophenyl), (4) 2-[2'-(1'-ethoxypropenyl)]-6-methoxynaphthalene (II; R is ethyl) and (5) 2-[2'-(1'-n-propoxypropenyl)] - 6 - methoxynaphthalene, respectively, each of which can be treated with acid according to the procedure of Example 1C to yield 2-(6'-methoxy-2'-naphthyl)propanal.

Other substituted phenoxymethyl chlorides which can be used in the above procedure (4A) are: 4-t-octylphenoxymethyl chloride, 2-methoxyphenoxymethyl chloride, 4-bromophenoxymethyl chloride, 2-chlorophenoxymethyl chloride, 3-chlorophenoxymethyl chloride, 4-chlorophenoxymethyl chloride, 2,4-dichlorophenoxymethyl chloride, 4 - methylphenoxymethyl chloride, 2,5 - dichlorophenoxymethyl chloride, 2,6 - dichlorophenoxymethyl chloride, 2,3,4-trichlorophenoxymethyl chloride, 4-chloro-2-methylphenoxymethyl chloride, 3,5-dimethyl - 4 - chlorophenoxymethyl chloride, 3-nitro-4-chlorophenoxymethyl chloride, and 3-methoxy-4-chlorophenoxymethyl chloride to yield the corresponding substituted phenoxymethyltriphenylphosphonium chloride.

EXAMPLE 5

A solution of 1 g. of sodium borohydride in 3 ml. of water is added to an ice-cooled solution of 2 g. of 2-(6'-methoxy-2'-naphthyl)propanal in 120 ml. of methanol and the mixture then allowed to stand for 16 hours at room temperature. Excess reagent is decomposed by the addition of acetic acid and the solution is then concentrated to small volume under vacuum and diluted with water. The product is extracted with ethyl acetate and the extracts are washed with water, dried and evaporated to yield 2-(6'-methoxy-2'-naphthyl)propanol.

What is claimed is:
1. A compound selected from the group of compounds represented by the formula:

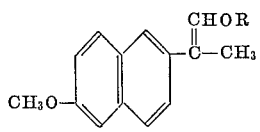

wherein R is lower alkyl, phenyl or substituted phenyl selected from the group consisting of lower alkylphenyl, halophenyl, nitrophenyl and lower alkoxyphenyl.

2. A compound according to claim 1 wherein R is lower alkyl.

3. A compound according to claim 1 wherein R is phenyl.

4. A compound according to claim 1 wherein R is methyl.

References Cited

UNITED STATES PATENTS 3,130,219  4/1964  Pommer et al. _____ 260—598

OTHER REFERENCES

Wagner et al.: Synthetic Organic Chemistry (1953), pp. 148–153 and 419–420.

Wittig et al.: Chemische Berichte, vol. 95 (1962), pp. 2514–2525.

BERNARD HELFIN, Primary Examiner

U.S. Cl. X.R.

260—600, 520, 999